(12) United States Patent
Yamane et al.

(10) Patent No.: US 8,172,449 B2
(45) Date of Patent: May 8, 2012

(54) KNEADING SCREW, TWIN SCREW EXTRUDER, AND METHOD FOR ASSEMBLING KNEADING SCREW

(75) Inventors: Yasuaki Yamane, Takasago (JP); Kazuo Yamaguchi, Takasago (JP); Toru Sakatani, Kobe (JP); Sayaka Yamada, Kobe (JP); Kazuhisa Fukutani, Kobe (JP); Koichi Honke, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 423 days.

(21) Appl. No.: 12/445,463

(22) PCT Filed: Nov. 6, 2007

(86) PCT No.: PCT/JP2007/071514
§ 371 (c)(1),
(2), (4) Date: Apr. 14, 2009

(87) PCT Pub. No.: WO2008/065860
PCT Pub. Date: Jun. 5, 2008

(65) Prior Publication Data
US 2010/0091603 A1    Apr. 15, 2010

(30) Foreign Application Priority Data
Nov. 28, 2006   (JP) .................................. 2006-320503

(51) Int. Cl.
*B29B 7/00*   (2006.01)
(52) U.S. Cl. ................. 366/79; 366/88; 366/90
(58) Field of Classification Search ........... 366/79, 366/88, 90
See application file for complete search history.

(56) References Cited

U.S. PATENT DOCUMENTS

| | | |
|---|---|---|
| 5,984,516 A | 11/1999 | Inoue et al. |
| 2001/0019729 A1 | 9/2001 | Inoue |
| 2002/0093118 A1 | 7/2002 | Inoue et al. |

(Continued)

FOREIGN PATENT DOCUMENTS

JP    48 1049    1/1973

(Continued)

OTHER PUBLICATIONS

Examination Report issued Jan. 18, 2011, in GCC Patent Application No. 2007/9536 (English translation only).

*Primary Examiner* — Joseph Del Sole
*Assistant Examiner* — James Sanders
(74) *Attorney, Agent, or Firm* — Oblon, Spivak, McClelland, Maier & Neustadt, L.L.P.

(57) ABSTRACT

To provide a kneading screw which can reduce such a phenomenon that a disproportional load is imposed onto a shaft of the kneading screw without degrading kneading performance of the kneading screw, a twin screw extruder with the kneading screw, and a method for assembling the kneading screw. In the kneading screw, each of the kneading rotor segments has at least one of a spiral kneading blade or a kneading blade extending in parallel with the axial direction, and is incorporated in the kneading screw such that top blade portions of the kneading blades at the adjacent ends of the kneading rotor segments adjacent to each other in the axial direction of the kneading screw are shifted in phase to each other, and such that the top blade portions of the kneading blades at the respective central positions in the axial direction of the adjacent kneading rotor segments are shifted larger in phase than the case where the top blade portions of the adjacent ends of the adjacent kneading rotor segments are equal in phase to each other.

7 Claims, 9 Drawing Sheets

U.S. PATENT DOCUMENTS

| | | |
|---|---|---|
| 2003/0128624 A1 | 7/2003 | Inoue et al. |
| 2006/0003042 A1 | 1/2006 | Inoue et al. |
| 2007/0211560 A1 * | 9/2007 | Takamoto et al. ............. 366/82 |

FOREIGN PATENT DOCUMENTS

| | | |
|---|---|---|
| JP | 61 263711 | 11/1986 |
| JP | 2000 153520 | 6/2000 |
| JP | 2001 205625 | 7/2001 |
| JP | 2002 210731 | 7/2002 |
| JP | 2003 245534 | 9/2003 |
| JP | 2006 1252 | 1/2006 |

* cited by examiner

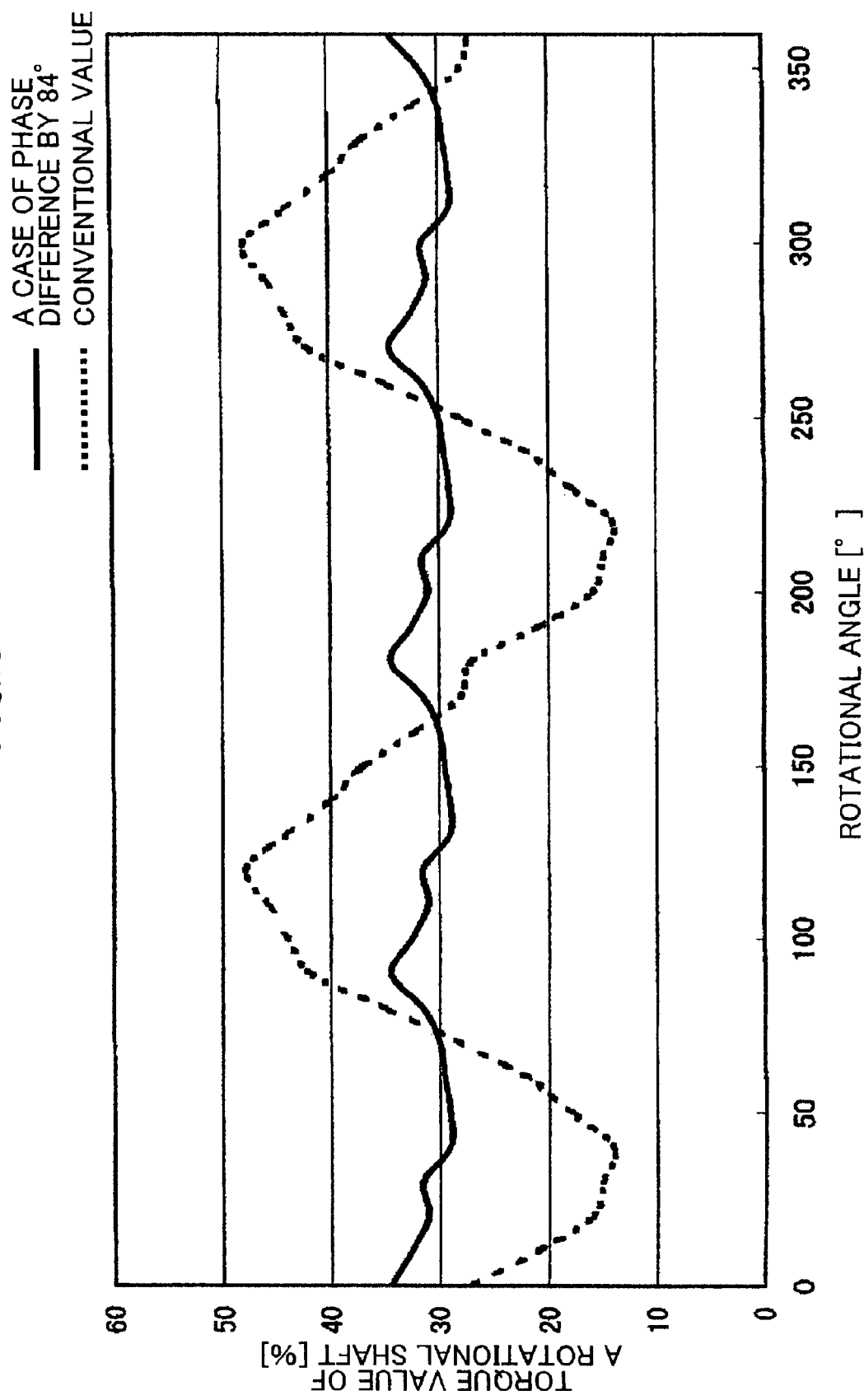

KNEADING SCREW, TWIN SCREW EXTRUDER, AND METHOD FOR ASSEMBLING KNEADING SCREW

TECHNICAL FIELD

The present invention relates to a kneading screw, a twin screw extruder, and a method for assembling the kneading screw. More specifically, the present invention relates to a kneading screw for a twin screw extruder which causes a material to be kneaded such as a rubber or a plastic to flow, and applies a shearing force to the material to be kneaded to obtain a kneaded mixture in a desired kneaded condition, a twin screw extruder with such a kneading screw, and a method for assembling the kneading screw.

BACKGROUND ART

It has been known to use a twin screw extruder as a kneader for kneading a rubber, a plastic, or the like. This twin screw extruder includes two kneading screws within a chamber having a communication in a barrel axial direction from one end side to the other end side, each of the kneading screws having a kneading rotor and segments each of which forms a flighted screw or the like. In this twin screw extruder, a material to be kneaded such as rubber or plastic is supplied through an input port at one side of a barrel into a chamber to knead the material in a kneading section including a kneading rotor arranged therein while extruding the material to be kneaded to the other side of the barrel according to a rotation of the kneading screw to obtain a kneaded mixture in a desired kneading condition.

The kneading rotor is formed by combining in an axial direction of the kneading screw a plurality of kneading rotor segments each having a spiral kneading blade and a kneading blade in parallel with the axial direction of the kneading screw. In this kneading rotor, the kneading rotor segments which are adjacent to each other in the axial direction are coupled to each other such that there is no uncontinuous portion such as a step at a junction therebetween, namely, such that the adjacent kneading rotor segments are coupled to each other smoothly in its cross section.

Now, there is a technique with regard to the above twin screw extruder which is disclosed, for example, in Patent Document 1 described below. This known technique will be explained below.

This Patent Document 1 discloses a technique as to a paired screw set (kneading screws) arranged within a chamber of a barrel as well as a kneader for rubber or rubbery composition, the kneader having a kneading blade section for kneading a material to be kneaded, at a predetermined position in an axial direction of the screw set.

The kneading blade section of the screw set of this kneader is so formed that a plurality of kneading rotors are coupled to each other in the axial direction. Each of the kneading rotors includes a spiral blade, and the spiral blade of each kneading blade section is continuously coupled to form the spiral blade of each kneading rotor blade section. The spiral blade of this kneading blade section has a screw lead of a length of more than 5 times the outer diameter of the screw set. In Patent Document 1, it is disclosed that the screw lead of the kneading blade section is set to the above length, which lowers the conveyance ability of the kneading blade section, increases the amount of the material to be kneaded being filled in the kneading section of the chamber, and enhances a kneading effect.

Also, in the screw set, the other segment member near to a downstream side of the kneading blade section has a length of more than one-half the length of the outer diameter of the screw set in the axial direction. This segment member has such a structure that a plurality of segments having blades of which top portions thereof are extending in parallel with the axis are coupled to each other such that cross sections vertical to the axis of the segments are shifted in phase to each other by 90 degrees with respect to the center of the axis.

However, according to the kneader disclosed in Patent Document 1, the amount of the material to be kneaded being filled in the chamber of the kneading section increases as the length of the screw lead of the kneading blade section becomes longer, and thus a shearing force between an inner wall of the chamber and a top blade portion of the kneading rotor (hereinafter referred to as a tip portion) becomes larger, whereas the load affecting a shaft of the kneading screw (screw set) becomes larger due to a reactive force caused by the force of the tip portion pressing the inner wall of the chamber through the material to be kneaded.

Also, as the length of the screw lead of the kneading blade section becomes longer, the spiral angle of a spiral blade becomes smaller, resulting in that the tip portion of the kneading rotor is placed leaning to a specific side within the chamber. Accordingly, a shaft of the kneading screw with a kneading rotor receives the disproportional load. The kneading screw having received the disproportional load then rotates involving torque fluctuations, thereby inducing a metal contact between the kneading rotor segment and the inner wall of the chamber with ease.

In other words, if the screw lead of the kneading blade section is made longer, the kneading screw is flexed by reception of the disproportional load, thereby raising such a problem that the metal contact between the kneading rotor segment and the inner wall of the chamber invites a shorter life (earlier wear) of the kneading rotor segment or the chamber.

In the kneader disclosed in Patent Document 1, the above other segment member near to the downstream side of the kneading blade section has such a structure that a plurality of kneading disc segments are arranged such that cross sectional shapes vertical to each of the axes are alternately shifted by 90 degrees with respect to the center of the axis, and thus the shaft of the kneading screw of these kneading disc sections will hardly be affected by the above disproportional load. However, even if such sections are adjacent to each other, the disproportional load will always affect the axis of the kneading screw because there is the kneading blade section having a longer screw lead.

(Patent Document 1)
Japanese Unexamined Patent Publication (Kokai) No. 2003-245534

DISCLOSURE OF THE INVENTION

The present invention was made in view of the above circumstances and thus its object is to provide a kneading screw capable of decreasing such a phenomenon that a disproportional load is imposed on a shaft of a kneading screw, without degrading kneading performance, a twin screw extruder with this kneading screw, and a method for assembling this kneading screw.

To achieve the above object, the kneading screw according to the invention is a kneading screw for a twin screw extruder that causes a material to be kneaded to flow, and applies a shearing force to the material to be kneaded to obtain a kneaded material in a desired kneading condition, and that comprises a kneading rotor segment aggregate including at least two kneading rotor segments for kneading the material to be kneaded, wherein each of the kneading rotor segments is coupled to each other side by side in an axial direction of the kneading screw, and includes at least one of a spiral kneading blade or a kneading blade extending in parallel with the axial direction, and wherein the kneading rotor segments adjacent to each other in the axial direction are incorporated in the kneading screw such that top blade portions of the kneading blades of the respective adjacent ends of the adjacent kneading rotor segments are shifted in phase to each other and such that the top blade portions of the kneading blades at the respective central positions in an axial direction of the adjacent kneading rotor segments shift larger in phase than a case where the top blade portions of the adjacent ends of the adjacent kneading rotor segments are equal in phase to each other.

BRIEF DESCRIPTION OF THE DRAWINGS

FIG. 9 is a graph showing a torque value of a rotational shaft per every rotation angle of a kneading screw.

PREFERRED MODE FOR CARRYING OUT THE INVENTION

A preferred mode for carrying out the invention will be described below with reference to the attached drawings. Together with a description of the embodiment of the twin screw extruder according to the invention, an embodiment of the kneading screw and a method for assembling the kneading screw will also be described below.

Figure 1:
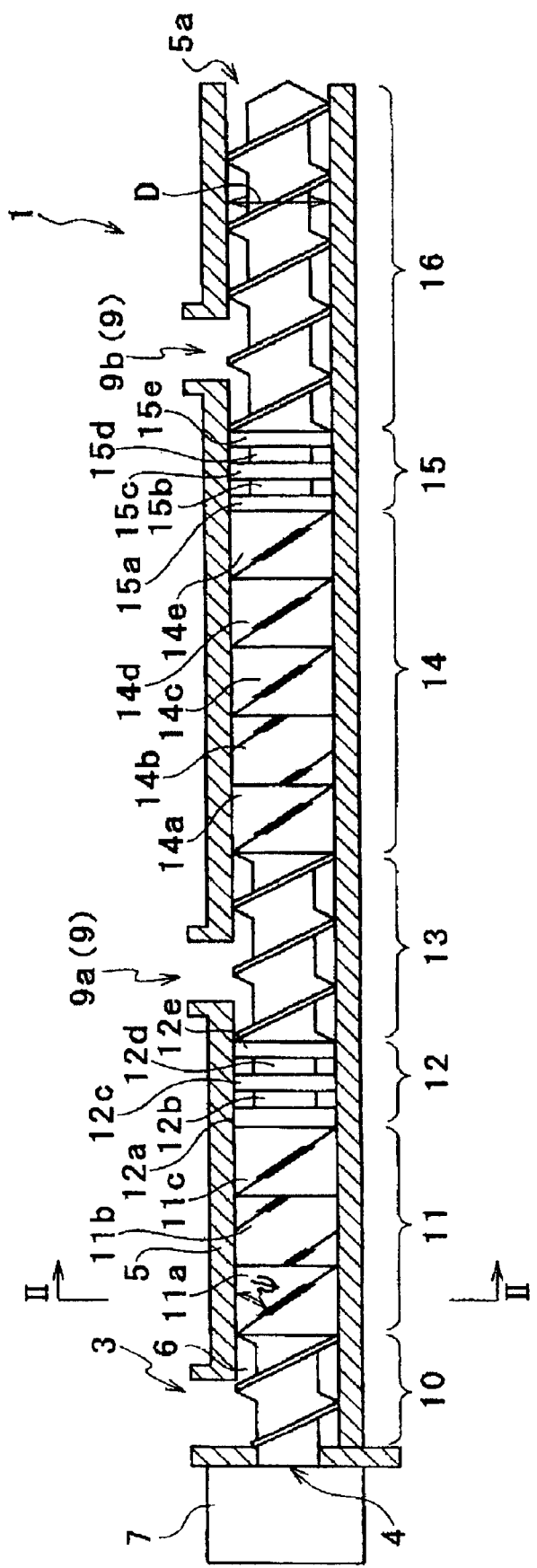
FIG. 1 is a cross sectional schematic view of a twin screw extruder according to an embodiment of the invention.

As shown in FIG. 1, a twin screw extruder 1 according to the present embodiment is a rotation intermesh-type twin screw extruder which rotates in the same direction, which includes a pair of kneading screws 4 which are cantilevered and a barrel 5 having a chamber 6, which is a cylindrical hollow section in which the kneading screws 4 rotate. The pair of kneading screws 4 are arranged such that the kneading screws overlap each other in a side view of FIG. 1 and such that shafts of both of the kneading screws extend in parallel with each other. These kneading screws 4 are coupled to a driving device 7 provided at one end side of the barrel 5. This driving device 7 drives the kneading screws to rotate in the same direction. Also, as shown in FIG. 2, the chamber 6 is formed into a cylindrical hollow section having a cocoon shaped cross section and houses therein two kneading screws 4.

On one end side of the barrel 5 in its axial direction, there is provided a supply port 3 (hopper section) for supplying a material to be kneaded such as rubber, plastic or the like into the chamber 6. The material to be kneaded supplied through this supply port 3 into the chamber 6 is conveyed from the left side (upstream side) toward the right side (downstream side) in FIG. 1 by a rotation of two kneading screws 4 within the chamber 6 in the axial direction of the kneading screws 4 (hereinafter simply referred to as the "axial direction") as well as is continuously kneaded. The kneaded material will be discharged from a top end 5a of the twin screw extruder 1 to the outside by a third screw section 16, which will be described later, at the lowermost stream of the kneading screw 4.

Figure 2:
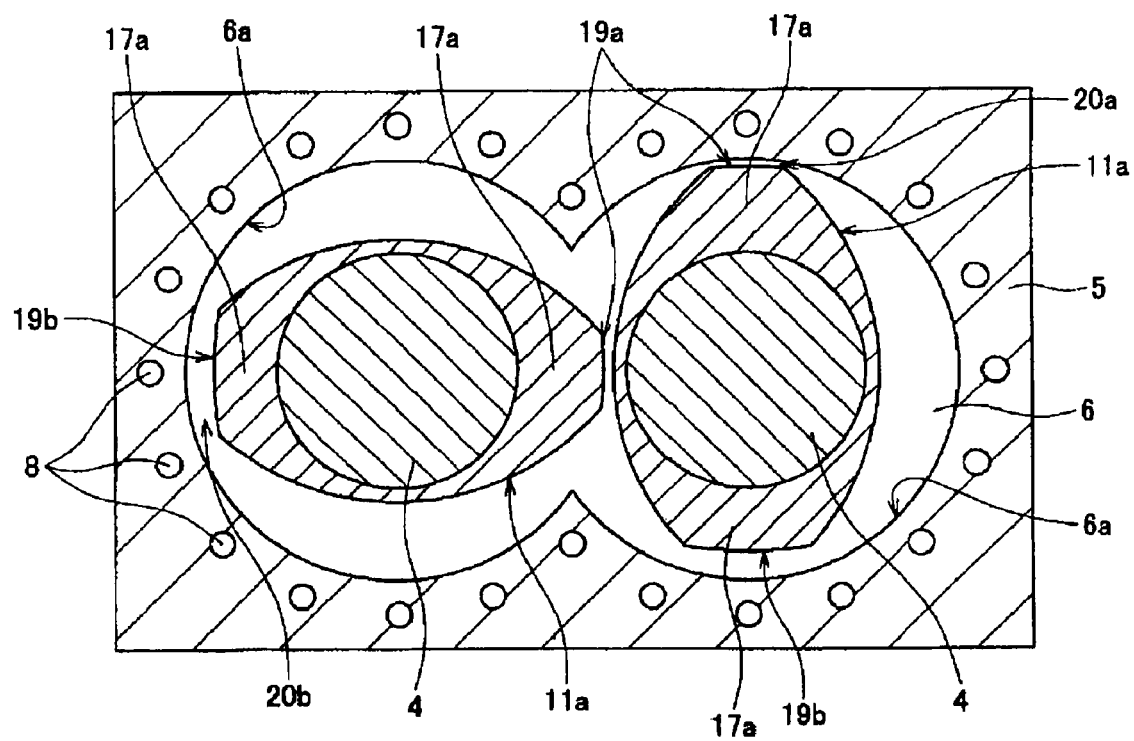
FIG. 2 is a cross sectional view of the twin screw extruder of FIG. 1 taken along line II-II.

As shown in FIG. 2, the barrel 5 is provided with a plurality of coolant paths 8 formed therein in an axial direction of the barrel in such a manner the coolant paths 8 enclose the circumference of the chamber 6. Passing the coolant such as cooling water through these coolant paths 8 will constrain the material to be kneaded from becoming a high temperature while it is kneaded within the chamber 6. Also, the barrel 5 is provided with openings 9 (9a, 9b) at plural positions in the axial direction of the barrel for the sake of degassing and observation. Discharge of gas generated while kneading the material, supply of auxiliary material, and observation of the kneading condition of the material to be kneaded can be done through these openings 9.

The kneading screw 4 of the present embodiment as shown in FIG. 1 includes a first screw section 10, a first kneading section 11, a first kneading disc section 12, a second screw section 13, a second kneading section 14, a second kneading disc section 15, and a third screw section 16 in such a manner that each of those segment members is coupled to each other in the axial direction of the kneading screw in this order.

The first and the second kneading sections (11, 14) are provided for the purpose of kneading the material to be kneaded. The first kneading section 11 is arranged at an immediate downstream side of the first screw section 10 as well as the second kneading section 14 is arranged at an immediate downstream side of the second screw section 13. Each of the first and the second kneading sections (11, 14) includes kneading rotor segments (11a-11c, 14a-14e), each of which has a spiral angle ψ in a direction that the material to be kneaded is discharged toward the downstream side. An aggregate of these kneading rotor segments 11a-11c and an aggregate of the kneading rotor segments 14a-14e are encompassed within the concept of the kneading rotor segment aggregate according to the present invention.

Figure 3:
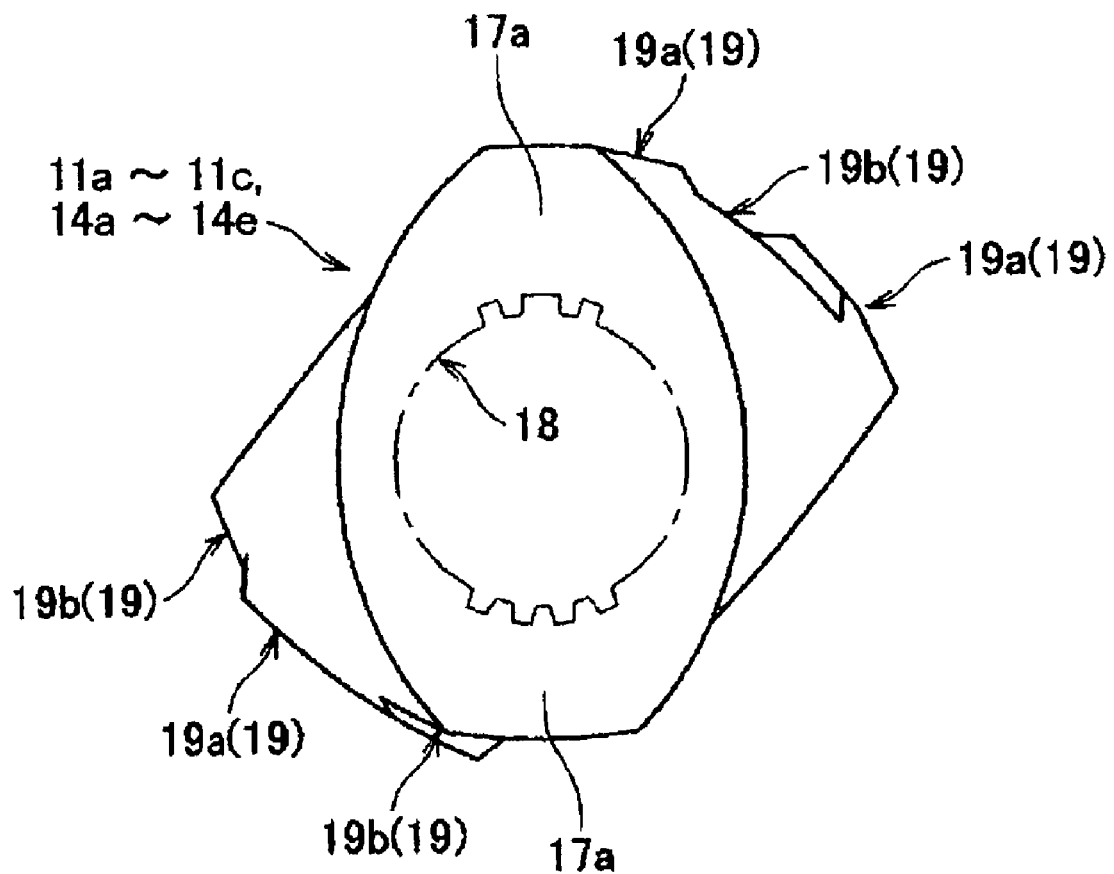
FIG. 3 is a schematic view showing a state of one kneading rotor segment of FIG. 1 viewed from an axial direction.
Figure 4:
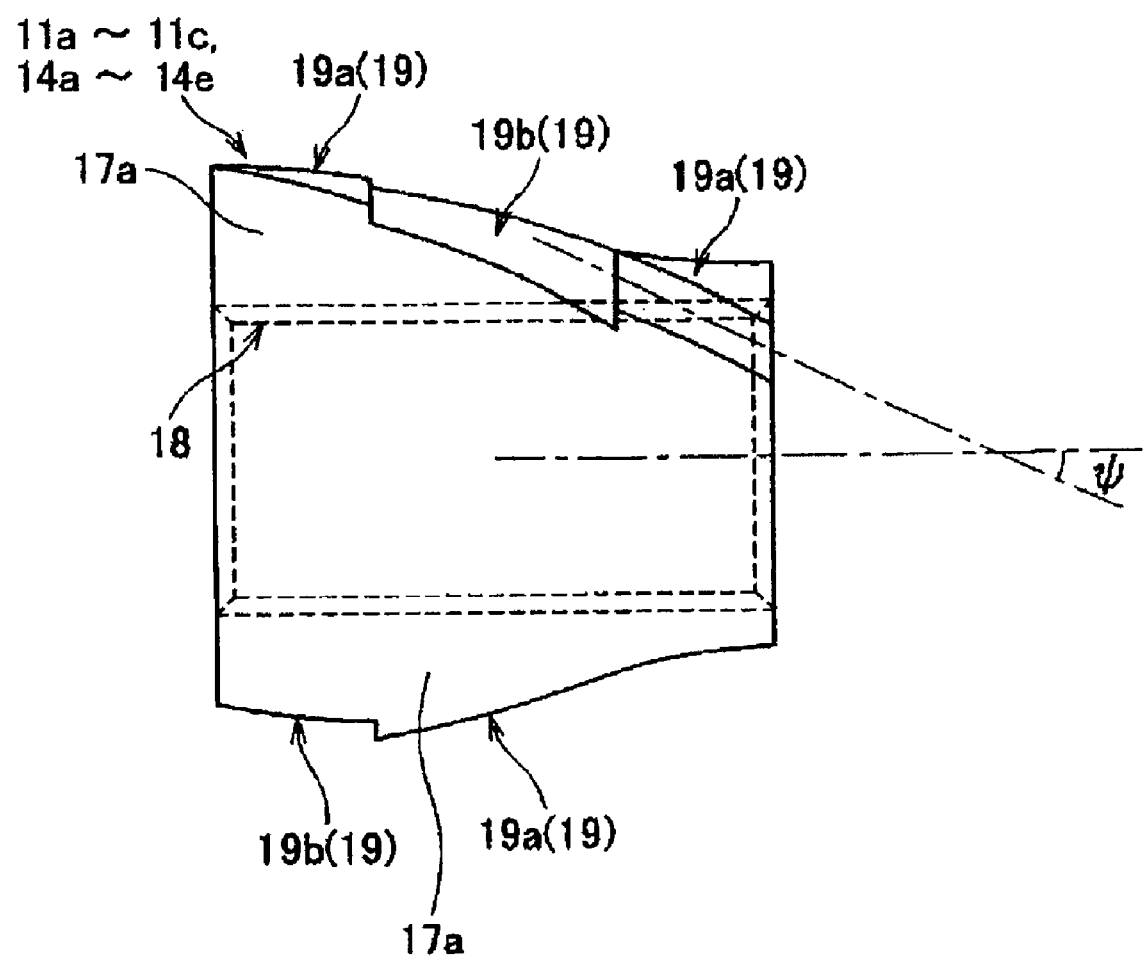
FIG. 4 is a side view of the kneading rotor segment of FIG. 3.

The kneading rotor segments (11a-11c, 14a-14e), while one of them is shown in FIGS. 3 and 4, include double blade sections of spiral shapes (double kneading blades) 17a having two tip portions 19 (top blade portions). Rotation of these kneading rotor segments (11a-11c, 14a-14e) can apply a strong shearing force to the material to be kneaded, such that a kneading process by means of a continuous operation or a batch operation can be realized. Further, the two kneading screws 4 rotate around their respective axes but in the same direction.

Each of the kneading rotor segments (11a-11c, 14a-14e) may have a different spiral angle ψ. As the spiral angle ψ becomes larger, namely, as the screw lead becomes shorter, the conveyance capacity of the material to be kneaded will be larger, whereas as the spiral angle ψ becomes smaller, namely, as the screw lead becomes longer, the material to be kneaded tends to be fully filled within the chamber 6 at the position of the kneading sections including the kneading rotor segments, thereby producing a better kneading effect.

When the spiral angle ψ is set to 0 degree, blade portions (kneading blades) of the kneading rotor segments (11a-11c, 14a-14e) are in parallel with the axial direction. Further, it is preferable to make a portion of each of the kneading rotor segments (11a-11c, 14a-14e) have a spiral angle ψ which is oriented in the direction that the material to be kneaded is forced back toward the upstream side when an especially strong kneading is required. The kneading rotor segments (11a-11c, 14a-14e) according to the embodiment have a length for one segment in the axial direction of at least equal to or more than one-quarter of the length of the outer diameter of the segment.

As shown in FIGS. 3 and 4, each of the kneading rotor segments (11a-11c, 14a-14e) includes a shaft hole 18 with splines. A shaft (rotation shaft) of the kneading screw 4 is inserted into this shaft hole 18, and thereby each segment member is coupled with the shaft of the kneading screw 4. According to the present embodiment, the circumference of the shaft is changed in phase for every 12 degrees corresponding to the pitch between the splines of the shaft hole 18 to allow the kneading rotor segments (11a-11c, 14a-14e) to be coupled with the shaft of the kneading screw 4.

The tip portions 19 of the double blade sections (double kneading blades) 17a formed on the kneading rotor segments (11a-11c, 14a-14e) are of partially notched shapes. These notch portions form lower tip portions 19b and portions other than the notch portions form higher tip portions 19a. The higher tip portions 19a and the lower tip portions 19b are sectionally formed alternately in the axial direction of the kneading rotor segments (11a-11c, 14a-14e) at the double blade section 17a. If the higher tip portions 19a are formed at a predetermined position in the axial direction of one of the double blade sections 17a, the lower tip portion 19b is formed on the corresponding position of the other double blade portion 17a in the axial direction. Accordingly, when the kneading screws 4 rotate, there appear wider tip clearances 20b and narrower tip clearances 20a alternately at spaces between the inner wall 6a of the chamber and the kneading rotor segments (11a-11c, 14a-14e) (see FIG. 2).

With such formation of the tip portions 19, since the material to be kneaded can pass through the wider tip clearances 20b with ease, the material can partially pass through with ease toward a blade surface of the blade portion opposite to the blade portion forming the wider tip clearances 20b. On the other hand, at the narrower tip clearances 20a, kneading will be facilitated while conveying the material to be kneaded to the downstream side. Also, with the above structure of the tip portions 19, the flowing condition of the material to be kneaded becomes complicated within the chamber 6.

Returning to FIG. 1, the first, the second, and the third screw sections (10, 13, 16) will be described below.

The first, the second, and the third screw sections (10, 13, 16) are provided for the purpose of conveying the material to be kneaded to the downstream side. The first, the second, and the third screw sections (10, 13, 16) include screw segments which are incorporated in the kneading screw 4. These screw segments have cross sectional shapes similar to those of the kneading rotor segments 11a except for top portions (tip portions) of the blade portions 17a, the cross sections thereof being shown in FIG. 2, and include the double blade sections. These double blade sections are formed into spiral shapes such that both top portions (tip portions) of the double blade sections and the inner wall 6a of the chamber 6 come very close to each other to make the clearances therebetween smaller, thereby providing a good meshing with the material to be kneaded and allowing the material to be kneaded to finally be completely forced away toward the downstream side.

The first and the second kneading disc sections (12, 15) will now be described below.

The first and the second kneading disc sections (12, 15) are provided for the purposes of filling the respective corresponding areas and their upstream sides within the chamber 6 with the material to be kneaded as well as kneading the material to be kneaded therein. The first kneading disc section 12 is arranged at an immediate downstream side of the first kneading section 11, and the second kneading disc section 15 is arranged at an immediate downstream side of the second kneading section 14.

The first and the second kneading disc sections (12, 15) include a plurality of kneading disc segments (12a-12e, 15a-15e) respectively, the kneading disc segments being incorporated in the kneading screw 4. The kneading disc segments (12a-12e, 15a-15e) have cross sections similar to those of the screw segments and include the double blade sections.

The double blade sections are formed in parallel with the axial direction. Therefore, the first and the second kneading disc sections (12, 15) will not produce any effect that the material to be kneaded is conveyed to the downstream side or is conveyed back to the upstream side, but will give a conveyance resistance to the material to be kneaded while it is conveyed from each of the kneading sections 11, 14 to the downstream side, thereby filling the material to be kneaded within the chamber 6 in a dammed up manner. Each of the kneading disc segments (12a-12e, 15a-15e) according to the embodiment has at the most a length (thickness) in the axial direction of equal to or less than 0.2 times, more preferably, equal to or less than 0.15 times as the length of the outer diameter of the segment.

In the first and the second kneading disc sections (12, 15), the plurality of kneading disc segments (12a-12e, 15a-15e) are coupled to each other in the axial direction in such a manner that the cross sectional shapes which are vertical to the shaft of the kneading screw 4 are shifted alternately by 90 degrees around the shaft of the kneading screw 4. As such, the first and the second kneading disc sections (12, 15) have portions at which cross sectional shapes, which are vertical to the shaft, change uncontinuously in the axial direction. Such uncontinuous change of the cross sectional shapes vertical to the shaft will provide a complex flowing condition to the material to be kneaded when it is kneaded, thereby allowing the material to be kneaded, to be mixed and to be dispersed sufficiently.

A coupling structure between the kneading rotor segments (8a, 8b) according to the embodiment will now be described below with reference to FIG. 5 to FIG. 7.

Figure 5:
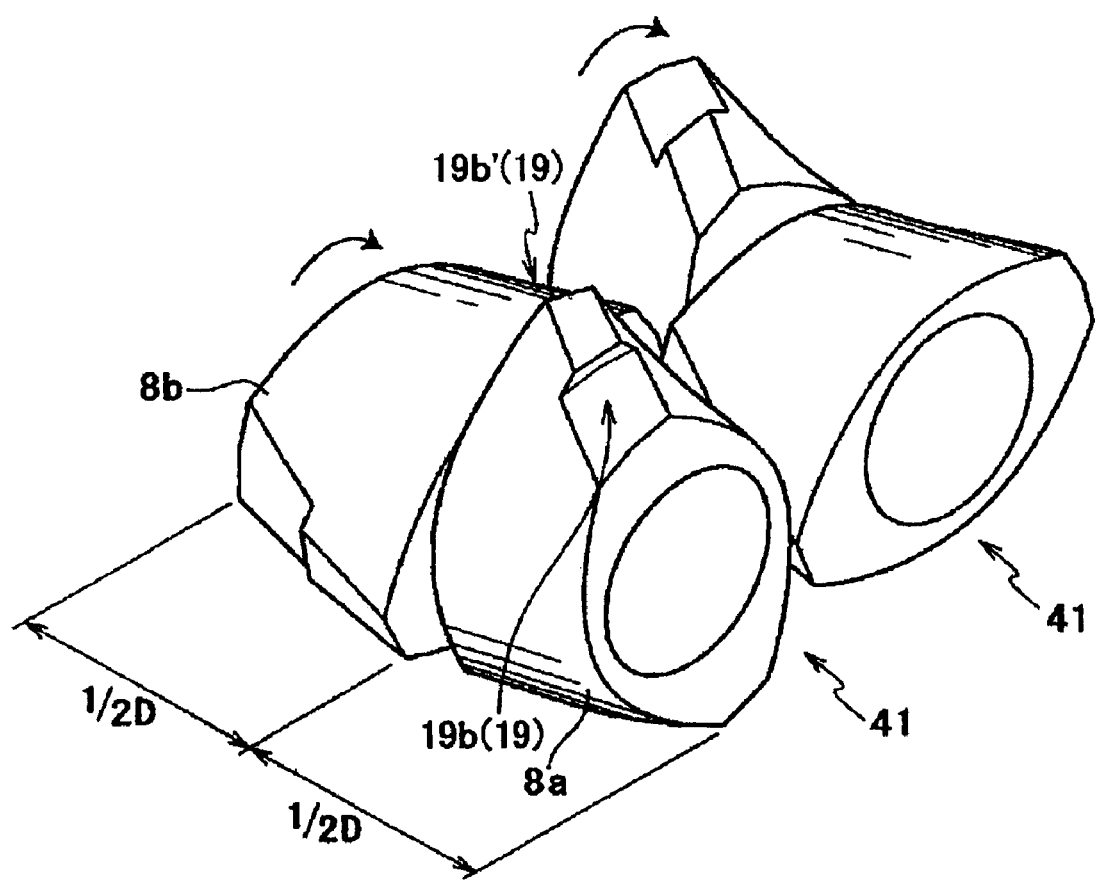
FIG. 5 is a schematic perspective view showing a state of combined kneading rotor segments.

The kneading rotor segments (8a, 8b) which are adjacent to each other in the axial direction are, as shown in FIG. 5, coupled to each other in such a manner that they are shifted in phase around the shaft. More specifically, the kneading rotor segment 8a and the kneading rotor segment 8b are incorporated in the kneading screw 41 in such a manner that the top blade portions (tip portions (19b, 19b')) at the respective central positions of both of the rotor segments (8a, 8b) in the axial direction are shifted larger in phase than the case where the top blade portions (tip portions 19a, 19b) of the adjacent segment ends are equal in phase to each other as shown in FIG. 6.

"The top blade portions (tip portions (19b, 19b')) at the respective central positions in the axial direction of the kneading rotor segments (8a, 8b) adjacent to each other in the axial direction are shifted in phase to each other" will now be described below with reference to FIG. 7.

Figure 7:
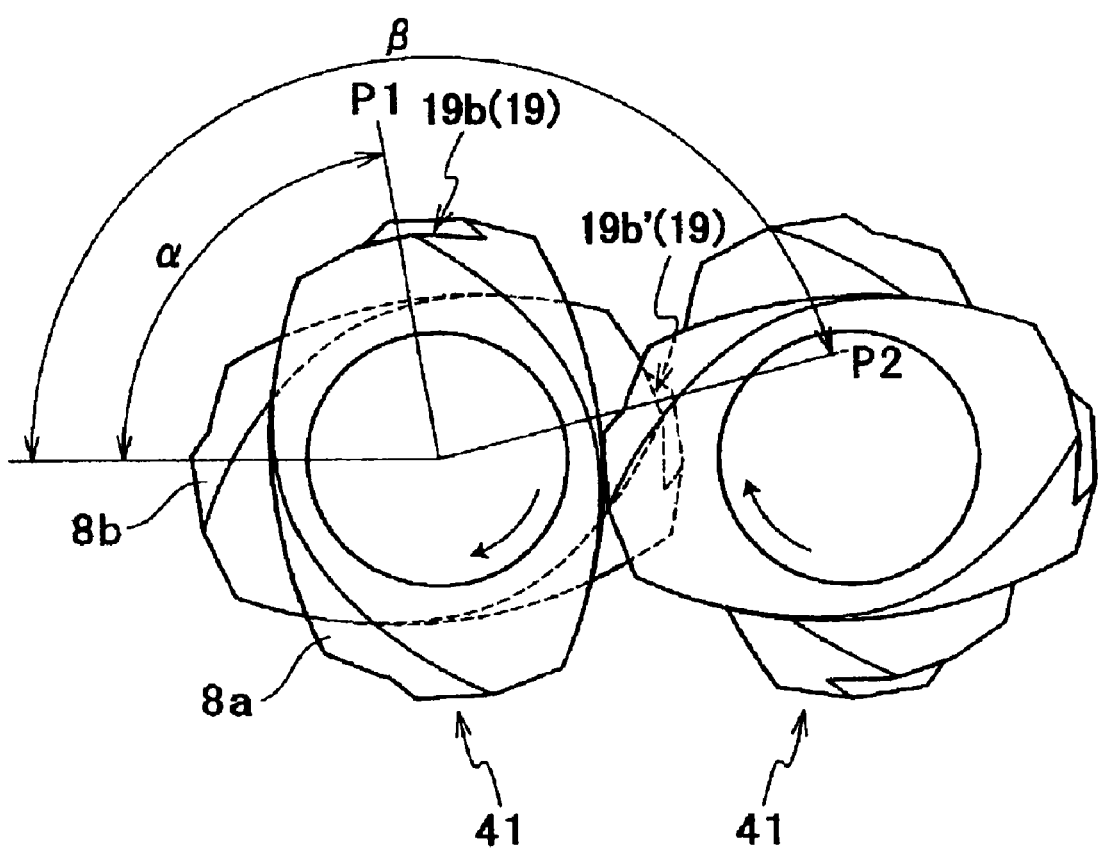
FIG. 7 is a front view showing a state of the combined kneading rotor segments of FIG. 5.

The lower tip portion 19b in FIG. 7 shows a top blade portion at the central position in the axial direction of one kneading rotor segment 8a of the adjacent kneading rotor segments (8a, 8b). Similarly, the lower tip portion 19b' in FIG. 7 shows a top blade portion at the central position in the axial direction of the other kneading rotor segment 8b of the adjacent kneading rotor segments (8a, 8b). Further, in FIG. 7, an angle α shows a phase of a central position (P1) in a rotational direction of the lower tip portion 19b (top blade portion) at the central position in the axial direction, and an angle β shows a phase of a central position (P2) in a rotational direction of the lower tip portion 19b' (top blade portion) at the central position in the axial direction.

As shown in FIG. 7, the kneading rotor segment 8a and the kneading rotor segment 8b, while both being incorporated in the kneading screw 41, are arranged such that the top blade portions (tip portions (19b, 19b')) at the respective central positions in the respective axial directions are shifted in phase by a phase difference between the angle β and the angle α. Accordingly, the top blade portions of the segment ends of the adjacent kneading rotor segments (8a, 8b) are shifted in phase to produce a step at the adjacent segment ends (see FIG. 5). According to the embodiment, the top blade portions (tip portions (19b, 19b')) are shifted in phase at the central position in the axial direction of the kneading rotor segments (8a, 8b) by 84 degrees to each other.

With the above structure, such an arrangement can be avoided that the tip portions 19 of the kneading rotor segments (8a, 8b) are arranged disproportionately at one directional side of the inner wall 6a of the chamber of the twin screw extruder 1 and thus a load affecting the shafts of the kneading screws 41 through the tip portions 19 can be alternatively eliminated between the adjacent kneading rotor segments (8a, 8b) even if the blades are elongated, or the tip clearances different in the axial direction or the tip clearances different in the circumferential direction are provided between the kneading blades of the kneading rotor segments (8a, 8b) and the inner wall 6a of the chamber. As such, such a phenomenon that the load is disproportionately imposed onto the shaft of the respective kneading screws 41 can be minimized to prevent the kneading rotor segments (8a, 8b) or the inner wall 6a of the chamber from having a shorter life (earlier wear).

If the tip portions 19 of the adjacent segment ends shift in phase to each other, there is produced a step (uncontinuous portion) at a position where the kneading rotor segments (8a, 8b) abut with each other; however, there are produced at this position advantageous results of a complex flowing condition of the material to be kneaded and thus kneading of the material to be kneaded is facilitated. Consequently, even if each tip portion (19b, 19b') at the respective central positions in the axial direction of the adjacent kneading segments (8a, 8b) are changed in phase to each other, the kneading performance will not be degraded. To the contrary, if there is produced too much effect in kneading, such measures may be appropriately employed that entire lengths of the kneading blade sections (kneading sections) are elongated or the tip clearances (20a, 20b (see FIG. 2)), which are spacial distances between the tip portions 19 and the inner wall 6a of the chamber, can be made larger.

In this text, it is preferable for such a means that shifts the phases to each other between the top blade portions (tip portions (19b, 19b')) at the respective central positions in the axial direction of the adjacent kneading rotor segments (8a, 8b) to be arranged in an anterior half section of the kneading screw 41. More preferably, such means is arranged at the first kneading section 11 closest to a side of the supply port 3 for supplying the material to be kneaded into the twin screw extruder 1 (into the chamber 6). This is because the problem that the disproportional load affects the shaft of the kneading screw 41 tends to occur at the first kneading section 11 in which a larger amount of the unkneaded material to be kneaded resides.

As shown in FIG. 5, both of the kneading rotor segment 8a and the kneading rotor segment 8b are set to have a length in the axial direction of one-half the length of the outer diameter (the length of the inner diameter D of the barrel 5) of the kneading rotor segments (8a, 8b). Therefore, each of the kneading sections (11, 14) is divided into many kneading rotor segments (8a, 8b). Then, the tip portions 19 of the adjacent kneading rotor segments among those many kneading rotor segments (8a, 8b) are shifted in phase as required, thereby preventing the tip portions 19 from being arranged disproportionately on one directional side of the inner wall 6a of the chamber of the twin screw extruder 1.

The lengths in the axial direction of the kneading rotor segments (8a, 8b) may be less than the lengths of their outer diameters. Also, the kneading rotor segments (8a, 8b) adjacent to each other in the axial direction may be formed into one piece by means of a forming method such as a shaving method. In this case, the total number of the kneading rotor segments can be reduced as well as the number of assembling processes of the kneading screw can be reduced.

Figure 8:
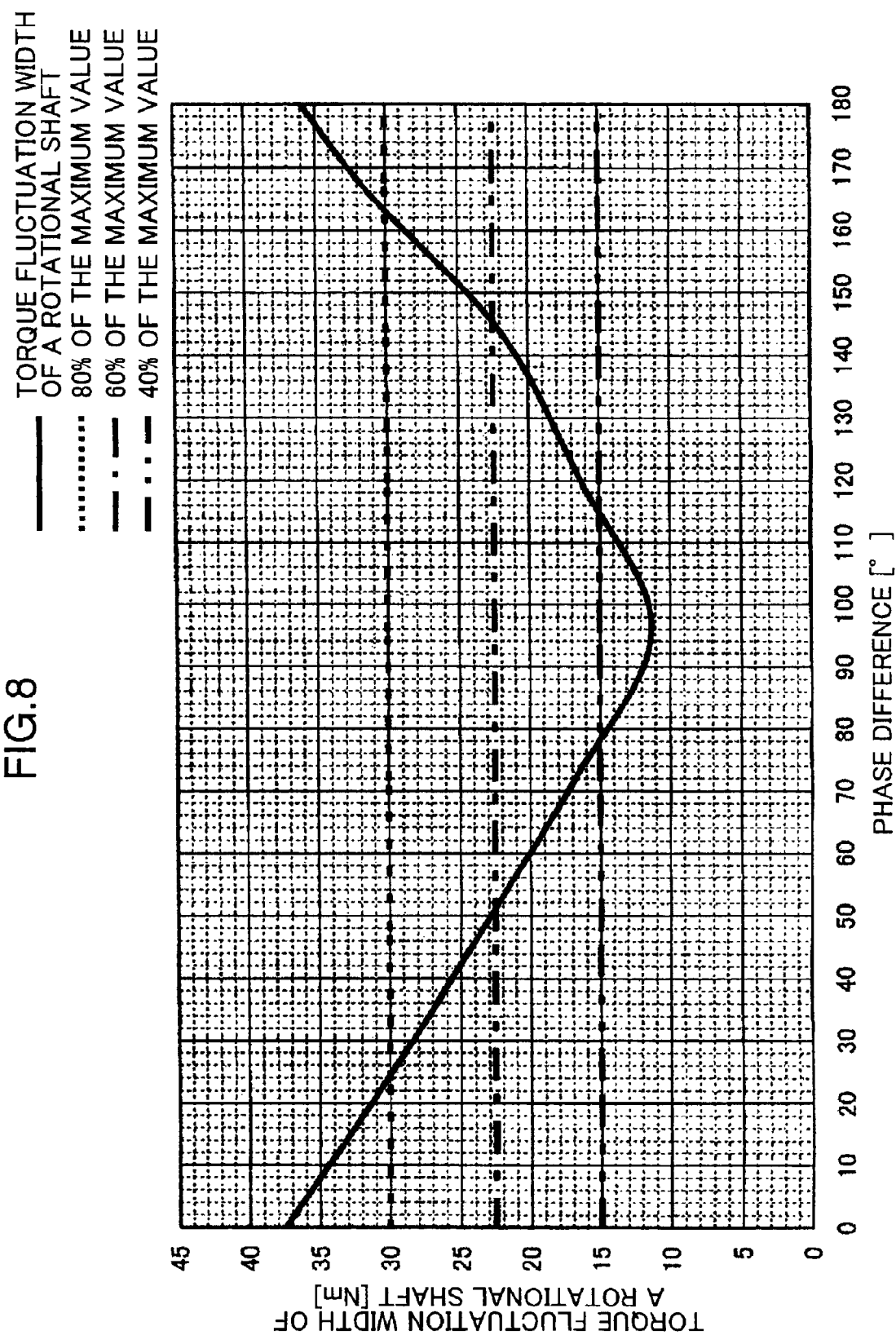
FIG. 8 is a graph showing a torque fluctuation width of a rotational shaft per every phase difference.

FIG. 8 shows a torque fluctuation width of a rotational shaft for every phase difference between the kneading rotor segment 8a and the kneading rotor segment 8b which are adjacent to each other in the axial direction when the kneading rotor segments (8a, 8b) having a structure as illustrated in FIG. 5 are used. FIG. 8 shows a result of a numerical analysis in a codirectionally rotating intermeshing-type twin screw extruder 1 under the conditions of a 72 mm outer diameter of the kneading rotor segments (8a, 8b), use of polypropylene (PP, MI (melt index)=10) as the material to be kneaded, and a 260 rpm rotational speed of the kneading screw 41. This numerical analysis was done by using the kneading screw 41 in which only two kneading rotor segments (8a, 8b) are coupled to its downstream side of the first screw section 10. In this text, the torque fluctuation width of the rotational shaft means a gap between a maximum value and a minimum value of the torque affecting onto the shaft of the kneading screw 41 according to the rotation of the kneading screw 41.

In FIG. 8, the solid line shows the torque fluctuation width of the rotational shaft when a difference in phase (hereinafter only referred to as "phase difference") is changed between the tip portions (19b, 19b') at the respective central positions in the axial direction of the kneading rotor segments (8a, 8b), the kneading rotor segments being adjacent to each other in the axial direction. The dotted line shows a 80% line of the maximum value of the torque fluctuation width of the rotational shaft in the above solid line (torque fluctuation width of the rotational shaft at the time of 0 degree phase difference at a left end of FIG. 8), the dashed-dotted line shows a 60% line of the maximum value, and the dashed-two dotted line shows a 40% line of the maximum value.

As shown in FIG. 8, when a phase difference between the kneading rotor segment 8a and the kneading rotor segment 8b is in a range between 48 and 147 degrees, the torque fluctuation width of the rotational shaft is constrained to a value equal to or less than about 60% of the maximum value. This shows that the load affecting the shaft of the kneading screw 41 through the tip portions 19 is eliminated between the adjacent kneading rotor segments 8a, 8b, thereby reducing the disproportional load imposed onto the shaft of the kneading screw 41. Also, as seen from FIG. 8, when the phase difference between the kneading rotor segment 8a and the kneading rotor segment 8b is in a range between 78 and 115 degrees, the torque fluctuation width of the rotational shaft is constrained to a value equal to or less than about 40% of the maximum value.

Considering the above, the torque fluctuation width of the rotational shaft of the kneading screw 41 can be reduced to a value equal to or less than about 60% of the value obtained when the tip portions 19 of the adjacent segment ends become equal in phase to each other (corresponding to the 0 degree phase difference at the left end of FIG. 8) if the kneading rotor segment 8a and the kneading rotor segment 8b are shifted in phase to each other by the phase difference in the range between 48 to 147 degrees. Similarly, the torque fluctuation width of the rotational shaft of the kneading screw 41 can be reduced to a value equal to or less than about 40% of a value when the tip portions 19 of the adjacent segment ends are equal in phase to each other if the kneading rotor segment 8a and the kneading rotor segment 8b are shifted in phase to each other by the phase difference in the range between 78 to 115 degrees.

Figure 6:
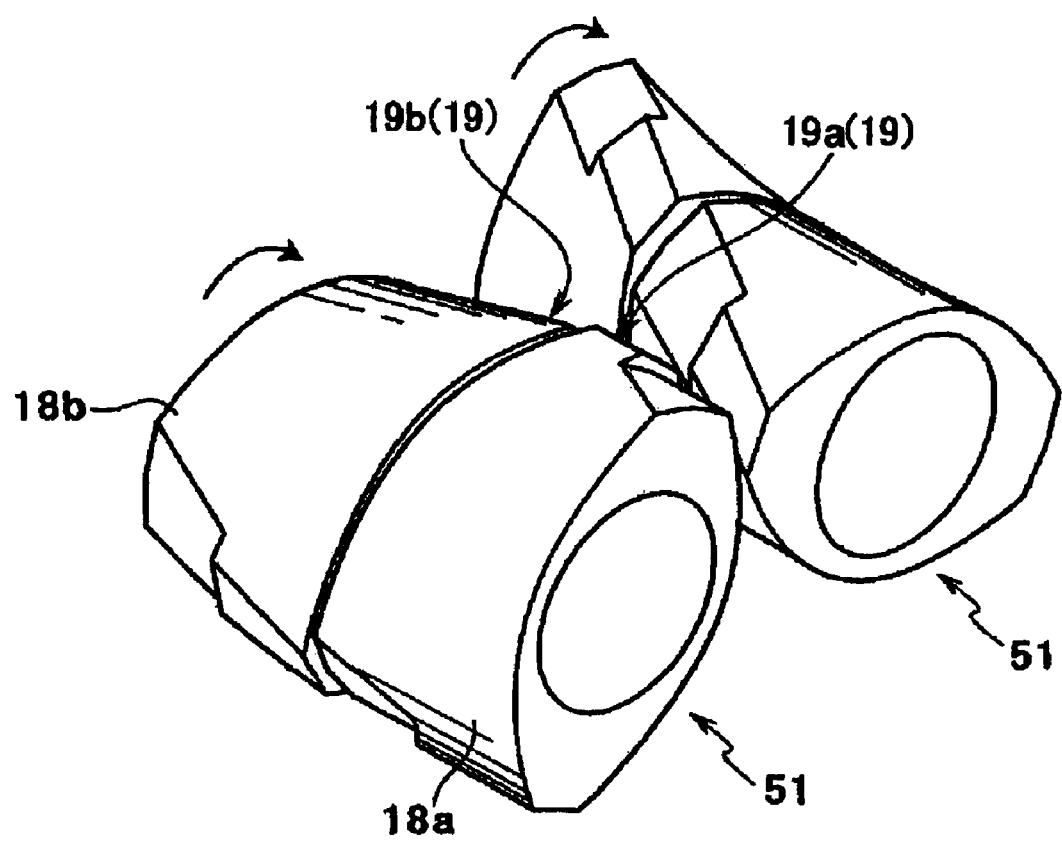
FIG. 6 is a perspective view showing a state of each kneading rotor segment of FIG. 5 with a changed rotation phase.

FIG. 9 shows a torque value of the rotational shaft per every rotational angle of the kneading screws (41, 51) when the kneading segments as shown in FIGS. 5 and 6 are employed. FIG. 9 shows an experiment result in which a torque of the rotational shaft which actually affects the kneading screws (41, 51) is measured under the conditions that the codirectional rotating intermeshing-type twin screw extruder 1 includes kneading rotor segments (8a, 8b) which are adjacent to each other in the axial direction and have outer diameters of 59 mm and employs polypropylene (PP, MI (melt index)=10) as the material to be kneaded, and the rotational speed of the kneading screw 41 is set to 600 rpm. In this experiment, the kneading screws (41, 51), each coupled only to two kneading rotor segments (8a, 8b) at the downstream side of the first screw section 10, are employed.

In FIG. 9, the solid line shows a change of torque value [%] of the rotational shaft per every rotation angle of the kneading screw 41 in which the tip portions (19b, 19b') are shifted in phase to each other by 84 degrees at the respective central positions in the axial direction of the kneading rotor segments (8a, 8b). Also, the dotted line shows a change of the torque value [%] of the rotational shaft of the conventional kneading screw 51 in which the tip portions (19a, 19b) of the adjacent segment ends of the kneading rotor segments (18a, 18b) are equal in phase to each other. The vertical scale of FIG. 9 shows a ratio of a measured torque in the form of % with regard to the maximum rating torque of the driving device 7 for the twin screw extruder 1.

It is apparent from FIG. 9 that the torque of the rotational shaft of the kneading screw 41, in which the kneading rotor segments (8a, 8b) are shifted in phase, is smaller in change and also in the maximum value than the torque of the rotational shaft of the kneading screw 51 in which the kneading rotor segments (8a, 8b) are equal in phase to each other. This is considered to be due an elimination of the load affecting the shaft of the kneading screw 41 through the tip portions 19 at both of the kneading rotor segments (8a, 8b) and thereby a reduction of the disproportional load imposed onto the shaft of the kneading screw 41, according to a setting, as required, of the phase difference at the respective central positions in the axial direction of the adjacent kneading rotor segments (8a, 8b).

While embodiments of the invention have been described and illustrated above, it should be understood that these are exemplary of the invention and are not to be considered as limiting, and other modifications can be made without departing from the scope of the present invention.

For example, a segment or a spacer, such as a kneading disc segment (single blade or double blade) or a screw segment, having an entire length equal to or less than the length of the outer diameter (the length of the rotational outer diameter) of the segments may be incorporated between the kneading rotor segment 8a and the kneading rotor segment 8b which are adjacent to each other in the axial direction as shown in FIG. 5. Also, a spacer may be incorporated between the kneading rotor segment 8a and the kneading rotor segment 8b which are adjacent to each other in the axial direction in order to adjust the meshing between a pair of kneading screws (41, 41).

If a disproportional load would occur in the second kneading section 14 due to an unmelted material, the kneading rotor segments which are adjacent to each other in the axial direction may be re-coupled with each other such that the top blade portions at the respective central positions in the axial direction of the adjacent kneading rotor segments shift larger in phase than the case where the top blade portions of the adjacent segment ends are equal in phase to each other, at any appropriate position of the second kneading section 14.

In the above embodiment, the phase difference is set for every 12 degrees, which corresponds to the minimum pitch between the splines provided in the shaft hole 18 of the kneading rotor segment. However, the pitch width of the phase difference may be set as required by using any appropriate means such as a change of the minimum pitch between the splines.

In the above embodiment, the case where the kneading rotor segments (8a, 8b) have spiral kneading blades has been exemplified. However, the invention is not limited thereto, but may have kneading rotor segments having kneading blades extending in parallel with the axial direction. In such a case, it is preferable for the adjacent kneading rotor segments to be incorporated in the kneading screw in such a manner that the top blade portions of the respective kneading blades shift in phase around the shaft of the kneading screw.

With the above structure, the tip portions (top blade portions) of the respective kneading rotor segments can be prevented from being arranged disproportionately at one directional side of the inner wall of the chamber of the twin screw extruder to thereby eliminate the load affecting the shaft of the kneading screw through the tip portions between the kneading rotor segments in a similar manner as the above embodiment. Further, similar to the above embodiment, since there is produced a so-called uncontinuous portion such as a step at a position where the kneading rotor segments abut each other, this position serves to complicate the flowing condition of the material to be kneaded, thereby producing an advantageous result of facilitation of kneading the material to be kneaded. Therefore, this structure also can reduce such a phenomenon that a disproportional load is imposed onto the shaft of the kneading screw, without degrading the kneading performance.

(Summary Of The Present Embodiment)

The present embodiment will be summarized as follows.

That is, the kneading screw according to the present embodiment is a kneading screw for a twin screw extruder, which causes the material to be kneaded to flow, and applies shearing force to the material to be kneaded to obtain a kneaded material in a desired kneading condition, the kneading screw comprising the kneading rotor segment aggregate including at least two kneading rotor segments for kneading the material to be kneaded, each of the kneading rotor segments being coupled to each other side by side in the axial direction of the kneading screw, and having at least one of a spiral kneading blade or a kneading blade extending in parallel with the axial direction, in which the kneading rotor segments adjacent to each other in the axial direction are incorporated in the kneading screw such that the top blade portions of the kneading blades of the respective adjacent ends of the adjacent kneading blades are shifted in phase to each other and such that the top blade portions of the kneading blades at the respective central positions in the axial direction of the adjacent kneading rotor segments shift larger in phase than the case where the top blade portions of the adjacent ends of the adjacent kneading rotor segments are equal in phase to each other.

According to the kneading screw, since the top blade portions of the kneading blades of the adjacent kneading rotor segments are arranged such that the top blade portions of the kneading blades are shifted larger in phase than the case where the top blade portions of the adjacent ends of the adjacent kneading rotor segments are equal in phase each other, the tip portions (top blade portions) of the respective kneading rotor segments can be prevented from being arranged disproportionately at one directional side of the inner wall of the chamber of the twin screw extruder, so that the load affecting the shaft of the kneading screw through the tip portions can be eliminated between the adjacent kneading rotor segments. Consequently, such a phenomenon that the load is imposed disproportionately onto the shaft of the kneading screw can be reduced. As such, the kneading rotor segments are or the chamber is prevented from having shorter life (earlier wear).

According to the kneading screw, since the top blade portions of the adjacent ends of the adjacent kneading rotor segments will not be equal in phase to each other, there is produced a so-called uncontinuous portion such as a step at a position where the kneading rotor segments abut each other. However, this contributes to a complex flowing condition of the material to be kneaded, resulting in producing an advantageous result of facilitation of kneading of the material to be kneaded. If there will be produced too much kneading effect, any appropriate measure can be taken, as required, such as elongating the entire lengths of the kneading blades and enlarging the tip clearances corresponding to the spacial distances between the tip portions and the inner wall of the chamber. Therefore, the kneading performance of the twin screw extruder will not be degraded even if the tip portions of the adjacent kneading rotor segments are shifted in phase to each other. As such, with the kneading screw, such a phenomenon that the load is imposed disproportionately onto the shaft of the kneading screw can be reduced, without degrading the kneading performance.

In the above kneading screw, it is preferable that the kneading screw has a plurality of kneading sections for kneading the material to be kneaded and that the kneading rotor segment aggregate is arranged in the kneading section nearest to a side where the material to be kneaded is supplied to the twin screw extruder among the plurality of kneading sections.

Such a problem that the load is imposed disproportionately onto the shaft of the kneading screw with the kneading rotor segments is seen remarkably at the anterior half section of the kneading screw where there is a larger amount of unkneaded material to be kneaded (insufficiently kneaded) left, and it is best seen at one kneading section which is closest to the side at which the material to be kneaded is supplied to the twin screw extruder among the plurality of the kneading sections.

Consequently, the merit of being able to reduce the phenomenon in which the load is imposed disproportionately onto the shaft of the kneading screw can be effectively obtained with the above structure, so that the kneading rotor segments or the inner wall of the chamber can be prevented from being worn too early at the kneading section closest to the side where the material to be kneaded is supplied which is under a grinding driving condition.

In the above kneading screw, it is preferable that each of the kneading rotor segments of the kneading rotor segment aggregate has a double kneading blade of a spiral shape as well as has a length equal to or less than the length of the outer diameter of each kneading rotor segment in the axial direction, and is incorporated in the kneading screw such that the top blade portions of the kneading blades at the respective central positions of the adjacent kneading rotor segments in the axial direction are shifted in phase to each other by a phase difference in a range between 48 and 147 degrees to each other.

According to the above structure, since the length of the kneading rotor segment in the axial direction is equal to or less than the length of the outer diameter of the kneading rotor segment, the kneading rotor segment aggregate including the plurality of kneading rotor segments is divided into many segments. Then, since the tip portions of the adjacent kneading rotor segments among the thus divided many kneading rotor segments are shifted in phase to each other, as required, the tip portions of the kneading rotor segments are prevented further from being arranged disproportionately at one directional side of the inner wall of the chamber of the twin screw extruder. Namely, distribution of a load receiving area enables more reduction of the phenomenon that the disproportional load is imposed onto the shaft of the kneading screw.

According to the above structure, since the top blade portions of the adjacent kneading rotor segments are shifted in phase to each other by the phase difference in the range between 48 and 147 degrees, the torque fluctuation width of the rotational shaft of the kneading screw can be reduced to equal to or less than about 60% of the torque fluctuation width of the rotational shaft when the top blade portions of the adjacent segment ends are equal in phase to each other.

In this case, it is preferable that each of the kneading rotor segments is incorporated in the kneading screw such that the top blade portions of the kneading blades at the respective central positions of the adjacent kneading rotor segments in the axial direction are shifted in phase to each other by the phase difference in a range between 78 and 115 degrees.

According to the above structure, since the top blade portions of the adjacent kneading rotor segments are shifted in phase to each other by the phase difference in the range between 78 and 115 degrees, the torque fluctuation width of the rotational shaft of the kneading screw can be reduced to equal to or less than about 40% of the torque fluctuation width of the rotational shaft when the top blade portions of the adjacent segment ends are equal in phase to each other.

In the above kneading screw, it is preferable that each of the kneading rotor segments of the kneading rotor segment aggregate has the spiral kneading blade and has a length equal to or less than one-half the length of the outer diameter of each kneading rotor segment in the axial direction.

According to the above structure, the kneading rotor segment aggregate including the plurality of kneading rotor segments is divided into many segments. Then, the tip portions of the adjacent kneading rotor segments among the thus divided many kneading rotor segments are shifted in phase to each other, as required, thereby preventing further the tip portions of the kneading rotor segments from being disproportionately arranged at one directional side of the inner wall of the chamber of the twin screw extruder. In other words, more distribution of the load receiving area will enable more reduction of such a phenomenon that the load is disproportionately imposed onto the shaft of the kneading screw.

In the above kneading screw, it is preferable that the kneading rotor segment aggregate includes the kneading rotor segments which are integrally formed.

According to the above structure, since such a structure that the shaft of the kneading screw can be prevented from receiving the disproportional load with the integrally formed kneading rotor segment aggregate is constructed, the total number of the kneading rotor segments can be reduced, so that the total number of assembly processes of the kneading screw can be reduced.

The twin screw extruder according to the invention is a twin screw extruder including any one of the above kneading screws formed into a pair, in which the paired kneading screws are arranged such that they mesh with each other and rotate in the same direction.

According to the above structure, the twin screw extruder with the kneading screw having any one of the above characteristics will be obtainable, so that such a phenomenon that the disproportional load is imposed onto the shaft of the kneading screw can be reduced without degrading the kneading performance thereof.

The method for assembling a kneading screw according to the invention is a method for assembling a kneading screw of a twin screw extruder that causes a material to be kneaded to flow, and applies a shearing force to the material to be kneaded to obtain a kneaded material in a desired kneading condition, comprising the step of incorporating at least two kneading rotor segments, each having a double kneading blade, in the kneading screw such that the kneading rotor segments are adjacent to each other in an axial direction of the kneading screw, wherein the step of incorporating each kneading rotor segment in the kneading screw includes a step of incorporating the kneading rotor segments adjacent to each other in the axial direction in the kneading screw such that top blade portions of the kneading blades of the respective adjacent ends of the adjacent kneading rotor segments are shifted in phase to each other, and such that the top blade portions of the kneading blades at the respective central positions in the axial direction of the adjacent kneading rotor segments are shifted larger in phase than the case where the top blade portions of the adjacent ends of the adjacent kneading rotor segments are equal in phase to each other.

According to this method for assembling a kneading screw, the tip portions (top blade portions) of the kneading rotor segments can be prevented from being arranged disproportionately at one directional side of the inner wall of the chamber of the twin screw extruder, so that the load affecting the shaft of the kneading screw through the tip portions can be eliminated between the adjacent kneading rotor segments, in a similar manner to the advantageous result of the above kneading screw. Therefore, such a phenomenon that the disproportional load is imposed onto the shaft of the kneading screw can be reduced. As a result, the kneading rotor segments or the chamber can be prevented from having a shorter life (earlier wear).

According to the method for assembling a kneading screw, since the top blade portions of the adjacent ends of the adjacent kneading rotor segments are not equal in phase to each other, there is produced a so-called uncontinuous portion such as a step at a position where the kneading rotor segments abut to each other. However, the uncontinuous portion provides a complex flowing condition to the material to be kneaded, thereby producing an advantageous result of facilitation of kneading the material to be kneaded. If there will be produced too much kneading effect, any measure can be taken, as required, such as shortening the entire lengths of the kneading blades and enlarging the tip clearances corresponding to the distances between the tip portions and the inner wall of the chamber. Accordingly, the kneading performance of the twin screw extruder will not be degraded even if the tip portions of the adjacent kneading rotor segments are shifted in phase to each other. Consequently, according to the method for assembling a kneading screw, such a phenomenon that the disproportional load is imposed onto the shaft of the kneading screw can be reduced without degrading the kneading performance of the kneading screw.

In the above method for assembling a kneading screw, it is preferable that each of the kneading rotor segments is incorporated in the kneading screw such that the top blade portions of the kneading blades at the respective central positions in the axial direction of the adjacent kneading rotor segments are shifted in phase by a phase difference in a range between 48 and 147 degrees to each other in the step of incorporating each of the kneading rotor segments in the kneading screw.

According to the above structure, since the top blade portions of the adjacent kneading rotor segments are shifted in phase to each other by the phase difference of the range between 48 and 147 degrees, the torque fluctuation width of the rotational shaft of the kneading screw can be reduced equal to or less than about 60% of the torque fluctuation width of the rotational shaft when the top blade portions of the adjacent segment ends are equal in phase to each other.

In the above case, it is preferable that each of the kneading rotor segments is incorporated in the kneading screw such that the top blade portions of the kneading blades at the respective central positions in the axial direction of the adjacent kneading rotor segments are shifted in phase by a phase difference in a range between 78 and 115 degrees to each other in the step of incorporating each kneading rotor segments in the kneading screw.

According to the above structure, since the top blade portions of the adjacent kneading rotor segments are shifted in phase to each other by the phase difference of the range between 78 and 115 degrees, the torque fluctuation width of the rotational shaft of the kneading screw can be reduced equal to or less than about 40% of the torque fluctuation width of the rotational shaft when the top blade portions of the adjacent segment ends are equal in phase to each other.

The invention claimed is:

1. A kneading screw for a twin screw extruder that causes a material to be kneaded to flow, and applies a shearing force to the material to be kneaded to obtain a kneaded material in a desired kneading condition, comprising:
    a kneading rotor segment aggregate including at least two kneading rotor segments for kneading the material to be kneaded,
    wherein each of the kneading rotor segments is coupled to each other side by side in an axial direction of the kneading screw, and includes at least one of a spiral kneading blade or a kneading blade extending in parallel with the axial direction; and
    wherein the kneading rotor segments adjacent to each other in the axial direction, and extending spirally in the same direction, are incorporated in the kneading screw such that top blade portions of the kneading blades of the respective adjacent ends of the adjacent kneading rotor segments are shifted in phase to each other in a range between 48 and 147 degrees to each other, and the kneading rotor segments have a structure such that a torque fluctuation width of a coupled rotational shaft is constrained to a value equal to or less than about 60% of the maximum value from the case where the top blade portions of the adjacent ends of the adjacent kneading rotor segments are equal in phase to each other.

2. The kneading screw according to claim 1, wherein the kneading screw has a plurality of kneading sections for kneading the material to be kneaded, and wherein the kneading rotor segment aggregate is arranged in a kneading section closest to a side where the material to be kneaded is supplied to the twin screw extruder among the plurality of kneading sections.

3. The kneading screw according to claim 1, wherein each of the kneading rotor segments of the kneading rotor segment aggregate has a double kneading blade of a spiral shape as well as has a length equal to or less than a length of an outer diameter of each kneading rotor segment in the axial direction.

4. The kneading screw according to claim 3, wherein each of the kneading rotor segments is incorporated in the kneading screw such that the top blade portions of the kneading blades at the respective central positions of the adjacent kneading rotor segments in the axial direction are shifted in phase to each other by a phase difference in a range between 78 and 115 degrees to each other.

5. The kneading screw according to claim 1, wherein each of the kneading rotor segments of the kneading rotor segment aggregate has the spiral kneading blade and has a length equal to or less than one-half the length of the outer diameter of each kneading rotor segment in the axial direction.

6. The kneading screw according to claim 1, wherein the kneading rotor segment aggregate includes kneading rotor segments which are integrally formed.

7. A twin screw extruder having a pair of kneading screws claim 1, wherein the pair of kneading screws are arranged such that they mesh with each other and rotate in the same direction.

* * * * *